US009144034B2

(12) United States Patent
Rege et al.

(10) Patent No.: US 9,144,034 B2
(45) Date of Patent: Sep. 22, 2015

(54) METHODS AND APPARATUS FOR REDUCING INTERFERENCE EFFECT ON DATA TRANSMITTED OVER A COMMUNICATION CHANNEL

(71) Applicant: Alcatel-Lucent USA Inc., Murray Hill, NJ (US)

(72) Inventors: Kiran M. Rege, Marlboro, NJ (US); Krishna Balachandran, Morganville, NJ (US); Joseph H. Kang, Belle Mead, NJ (US); Kemal M. Karakayali, Hoboken, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 9 days.

(21) Appl. No.: 14/026,581

(22) Filed: Sep. 13, 2013

(65) Prior Publication Data
US 2015/0078478 A1 Mar. 19, 2015

(51) Int. Cl.
*H04L 27/04* (2006.01)
*H04W 52/24* (2009.01)

(52) U.S. Cl.
CPC .................................. *H04W 52/246* (2013.01)

(58) Field of Classification Search
CPC ................................ H04B 7/0452; H04B 1/10
USPC .......................... 375/346, 267, 295, 341, 265
See application file for complete search history.

(56) References Cited

U.S. PATENT DOCUMENTS

| 7,653,153 | B2 | 1/2010 | Tosato et al. | |
| 8,238,471 | B2 * | 8/2012 | Hwang et al. | 375/296 |
| 8,320,432 | B1 * | 11/2012 | Chockalingam et al. | 375/219 |
| 2002/0097703 | A1 | 7/2002 | Nieczyporowicz et al. | |
| 2004/0194004 | A1 | 9/2004 | Betts | |
| 2009/0323840 | A1 | 12/2009 | Lee et al. | |
| 2010/0279729 | A1 | 11/2010 | Hui et al. | |

OTHER PUBLICATIONS

Costa, M.H.M., "Writing on Dirty Paper," *IEEE Transactions on Information Theory*, vol. 29, No. 3, May 1983.
Erez, U. and ten Brink, S., "A Close-to-Capacity Dirty Paper Coding Scheme," *IEEE Transactions on Information Theory*, vol. 51, No. 10, 2005.
Gallager, R.G., *Low-Density Panty-Check Codes*, MIT Press, Cambridge, MA, 1963.
MacKay, D.J.C., and Neal, R.M., "Near Shannon Limit Performance of Low Density Parity Check Codes," *Electronic Letters*, vol. 32, pp. 1645-1646, Aug. 1996.
Forney, G.D., "Coset Codes—Part I: Introduction and Geometrical Classification", IEEE Trans. on Information Theory, vol. 34, No. 5, Sep. 1988.

(Continued)

*Primary Examiner* — Qutbuddin Ghulamali
(74) *Attorney, Agent, or Firm* — Harness, Dickey & Pierce, P.L.C.

(57) ABSTRACT

In one example embodiment, a method for reducing an effect of an interference signal on data being transmitted over a communication channel includes determining, by the processor, a code word based on a base information vector and an auxiliary vector, the base information vector including base information bits representing the data to be transmitted over the communication channel, the auxiliary vector corresponding to an interference vector representing the interference signal. The method further includes generating, by the processor, a transmit vector for transmission based on the determined code word and the interference vector.

22 Claims, 6 Drawing Sheets

(56) References Cited

OTHER PUBLICATIONS

Ungerboeck, G., "Trellis-Coded Modulation with Redundant Signal Sets Part I: Introduction", IEEE Communications Magazine, vol. 25, No. 2, Feb. 1987.

Office Action for corresponding U.S. Appl. No. 13/853,630, dated Jun. 19, 2014.
Office Action for corresponding U.S. Appl. No. 13/853,629, dated Sep. 10, 2014.

* cited by examiner

| | |
|---|---|
| +15d | 1000 |
| +13d | 1001 |
| +11d | 1011 |
| +9d | 1010 |
| +7d | 1110 |
| +5d | 1111 |
| +3d | 1101 |
| +1d | 1100 |
| -1d | 0100 |
| -3d | 0101 |
| -5d | 0111 |
| -7d | 0110 |
| -9d | 0010 |
| -11d | 0011 |
| -13d | 0001 |
| -15d | 0000 |

*FIG. 4*

METHODS AND APPARATUS FOR REDUCING INTERFERENCE EFFECT ON DATA TRANSMITTED OVER A COMMUNICATION CHANNEL

BACKGROUND

In a conventional communication system, when a signal carrying a certain number of information bits representing data is transmitted to a receiving device over a communication channel, the signal is contaminated by channel noise and/or interference from another signal, which may be referred to as an interference signal. If the signal is to be successfully received at the receiving device in the presence of noise as well as the interference signal, the transmit signal has to be strong enough to overcome both the noise and the interference.

Conventional communication systems simply transmit the transmit signal at a power level that is high enough to overcome the noise as well as the interference signal. However, an increase of signal power may be wasteful. Another proposed solution is based on vector modulation in order to implement what is known as Dirty Paper Coding (DPC).

DPC provides, in theory, that if an interference signal is known to the transmitter non-causally, it is possible to devise an encoding scheme that can deliver the desired signal to the intended receiver as efficiently, in terms of the power required to achieve error-free delivery, as in the case where the interference signal does not exist. In other words, DPC provides that in a communication channel with a constraint on the transmit energy and in which the received signal is corrupted by channel noise as well as an interference signal, non-causally known to the transmitter, it is possible to construct a coding scheme such that the error performance of the system would be similar to the error performance of the system in the absence of the interference signal.

SUMMARY

Some embodiments relate to methods and apparatuses for reducing an effect of an interference signal on data being transmitted over a communication channel. The reduction of the effect of the interference signal is achieved by determining a code vector such that the code vector is close to the interference vector. A transmit vector is then constructed by, for example, subtracting the interference vector from the code vector. The transmit vector is then communicated over the communication channel to a receiving unit.

In one example embodiment, a method for reducing an effect of an interference signal on data being transmitted over a communication channel includes determining, by the processor, a code word based on a base information vector and an auxiliary vector, the base information vector including base information bits representing the data to be transmitted over the communication channel, the auxiliary vector corresponding to an interference vector representing the interference signal. The method further includes generating, by the processor, a transmit vector for transmission based on the determined code word and the interference vector.

In yet another example embodiment, the determining the code word comprises determining the auxiliary vector.

In yet another example embodiment, the determining the auxiliary vector includes determining a number of the base information bits to be transmitted over a single use of the communication channel and determining a number of times the communication channel is to be used for transmitting the base information bits based on the number of the base information bits to be transmitted over a single use of the communication channel. The determining the auxiliary vector further includes determining a number of auxiliary bits forming the auxiliary vector based on the number of times the communication channel is to be used, a transmit energy associated with transmitting the data and a transmit energy associated with the interference signal, wherein the determining the auxiliary vector is based on the determined number of auxiliary bits.

In yet another example embodiment, the determining the auxiliary vector includes determining binary representations of interference samples of the inference vector based on the determined number of times the communication channel is to be used and a signal constellation and mapping values corresponding to one or more most significant bits of the binary representation of the interference samples to auxiliary bits of the auxiliary vector, the mapped values representing the auxiliary vector.

In yet another example embodiment, the determining the code word includes determining a rate associated with the determined code word and determining a length of the code word based on the determined rate, the number of the base information bits and the number of the auxiliary bits, wherein the determining the code word is based on the base information vector, the determined auxiliary vector and the determined length.

In yet another example embodiment, the determining the code word includes determining the signal constellation for encoding the code word based on the determined length and the determined number of times the communication channel is to be used, wherein the determining the code word is based on the base information vector, the determined auxiliary vector, the determined length and the determined signal constellation.

In yet another example embodiment, the determining the code word includes determining a linear combination of the base information bits and the determined auxiliary bits, wherein the determined code word is a concatenation of the auxiliary bits, the base information bits and the linear combination.

In yet another example embodiment, the method further includes determining a permutation of the determined code word and determining a code vector based on the permuted code word, wherein the generating the transmit vector includes subtracting the interference vector from the determined code vector.

In yet another example embodiment, the determining a code vector comprises mapping entries of the permuted code word to signal points using a mapping scheme.

In yet another example embodiment, the method further includes refining the code vector to reduce a distance between the interference vector and the code vector.

In yet another example embodiment, the refining the code vector includes changing auxiliary bits of the determined auxiliary vector and determining an updated code vector based on the changed auxiliary bits. The method further includes determining whether a first distance between the updated code vector and the interference vector is less than a second distance between the code vector and the interference vector and replacing the code vector with the updated code vector upon determining that the first distance is less than the second distance.

In yet another example embodiment, the method further includes transmitting the transmit vector over the communication channel.

In one example embodiment, an encoding device includes a processor configured to determine a code word based on a base information vector and a determined auxiliary vector, the base information vector including base information bits representing data to be transmitted over a communication channel, the auxiliary vector corresponding to an interference vector representing the interference signal. The processor is further configured to generate a transmit vector for transmission based on the determined code word and the interference vector.

In yet another example embodiment, the processor is configured to determine the code word by determining the auxiliary vector.

In yet another example embodiment, the processor is configured to determine the auxiliary vector by determining a number of the base information bits to be transmitted over a single use of the communication channel and determining a number of times the communication channel is to be used for transmitting the base information bits based on the determined number of the base information bits to be transmitted over a single use of the communication channel. The processor is further configured to determine the auxiliary vector by determining a number of auxiliary bits forming the auxiliary vector based on the determined number of times the communication channel is to be used, a transmit energy associated with transmitting the data and a transmit energy associated with the interference signal, wherein the processor determines the auxiliary vector based on the determined number of auxiliary bits.

In yet another example embodiment, the processor is configured to determine the auxiliary vector by determining binary representations of interference samples of the inference vector based on the determined number of times the communication channel is to be used and a signal constellation and mapping values corresponding to one or more most significant bits of the binary representation of the interference samples to auxiliary bits of the auxiliary vector, the mapped values representing the auxiliary vector.

In yet another example embodiment, the processor is configured to determine the code word by determining a rate associated with the determined code word and determining a length of the code word based on the determined rate, the number of the base information bits and the number of the auxiliary bits, wherein the determining the code word is based on the base information vector, the determined auxiliary vector and the determined length.

In yet another example embodiment, the processor is configured to determine the code word by determining the signal constellation for encoding the code word based on the determined length and the determined number of times the communication channel is to be used, wherein the processor determines the code word based on the base information vector, the determined auxiliary vector, the determined length and the determined signal constellation.

In yet another example embodiment, the processor is further configured to determine the code word by determining a linear combination of the base information bits and the determined auxiliary bits, wherein the determined code word is a concatenation of the auxiliary bits, the base information bits and the linear combination.

In yet another example embodiment, the processor is further configured to determine a permutation of the determined code word and determine a code vector based on the permuted code word, wherein the processor generates the transmit vector by subtracting the interference vector from the determined code vector.

In yet another example embodiment the processor determines the code vector by mapping entries of the permuted code word to signal points using a mapping scheme.

In yet another example embodiment, the processor is further configured to refine the code vector to reduce a distance between the interference vector and the code vector.

In yet another example embodiment, the processor is further configured to refine the code vector by changing auxiliary bits of the determined auxiliary vector, determining an updated code vector based on the changed auxiliary bits, determining whether a first distance between the updated code vector and the interference vector is less than a second distance between the code vector and the interference vector and replacing the code vector with the updated code vector upon determining that the first distance is less than the second distance.

In yet another example embodiment, the transmitting unit is configured to transmit the transmit vector over the communication channel.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein:

FIG. 4 depicts a signal constellation used in encoding the data, according to an example embodiment;

DETAILED DESCRIPTION OF EXAMPLE EMBODIMENTS

Figure 1:
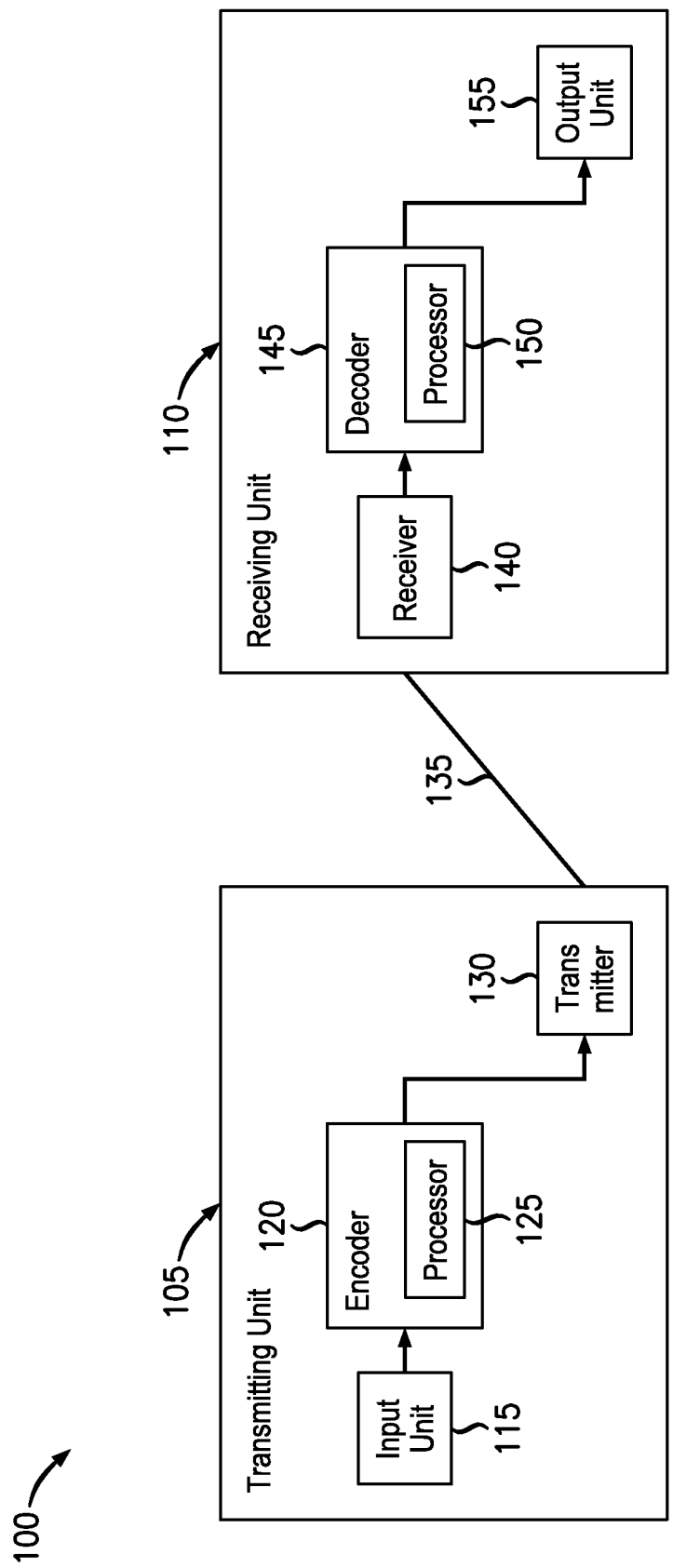
FIG. 1 depicts a communication system, in which an example embodiment for reducing interference signal effect is implemented.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This disclosure may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Devices (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

While there have been attempts to construct encoding schemes to implement dirty paper coding, none have found practical applications, mainly because of the complexity associated with such methods. Another reason that implementation of DPC has not been successful is that efforts have been mainly directed towards construction schemes that are aimed at getting close to the promised channel capacity, which typically required highly complex encoding schemes.

FIG. 1 depicts a communication system, in which an example embodiment for reducing interference signal effect is implemented. The communication system 100 includes a transmitting unit 105 and a receiving unit 110, which may communicate via a communication channel 135. The transmitting unit 105 may include an input unit 115, an encoder 120 and a transmitter 130. The encoding unit 120 includes a processor 125. The receiving unit 110 includes a receiver 140, a decoder 145 and an output unit 155. The decoding unit 145 may include a processor 150. The communication system 100 may be any type of system in which a transmitting device communicates data to a receiving device. For example, such a system may be a cellular network employing a base station. The transmitter 130 may be any one of, but not limited to, a base station of a cellular network, a transmitter in a device communicating with a base station, etc. The device may be any one of, but not limited to, a cellular telephone, a laptop computer, a tablet computer, etc. The communication channel 135 may be a wired or a wireless communication channel between the transmitter 130 of the transmitting unit 105 and the receiver 140 of the receiving unit 110. Similar to the transmitter 130, the receiver 140 may be any one of, but not limited to, a base station of a cellular network, a receiver in a device communicating with a base station, etc. The device may be any one of, but not limited to, a cellular telephone, a laptop computer, a tablet computer, etc.

Figure 2:
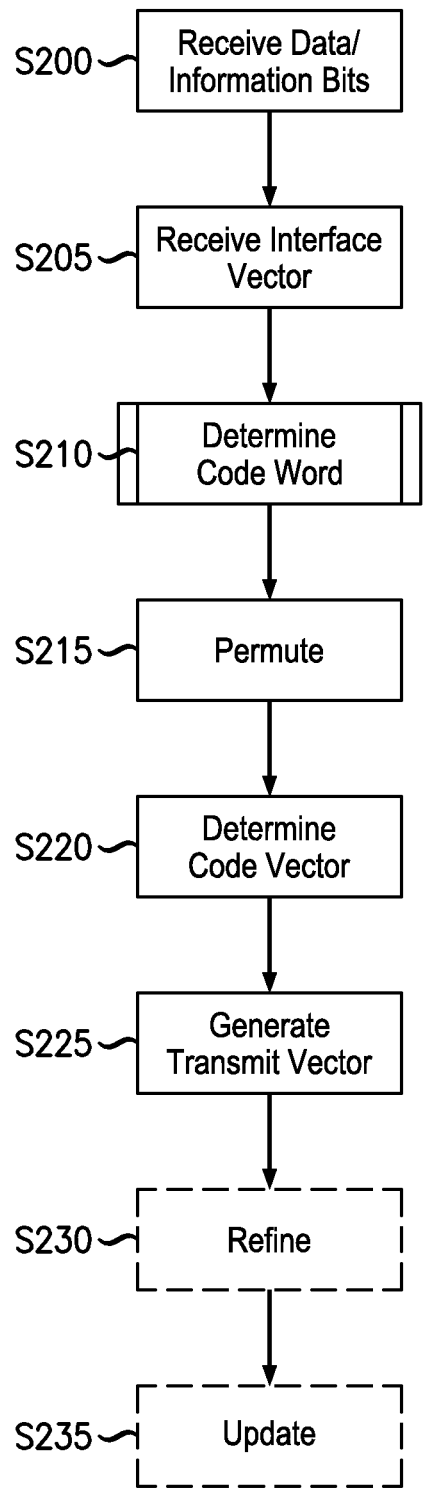
FIG. 2 depicts a method for encoding data to be transmitted over a communication channel, according to an example embodiment.

FIG. 2 depicts a method for encoding data to be transmitted over a communication channel, according to an example embodiment. At S200, the transmitting unit 105, via the input unit 115 may receive data that is to be transmitted over the communication channel 135. Furthermore, at S205, the transmitting unit 105, via the input unit 115, may receive an interference signal. In one example embodiment, while the interference signal is known to the transmitting unit 105, the receiving unit 110 may not be aware of what the interference signal may be.

At S210, the transmitting unit 105, via the processor 125 of the encoder 120 may determine a code word associated with the base information vector to be transmitted over the communication channel 135. The process of determining the code word will be explained below with reference to FIG. 3.

Figure 3:
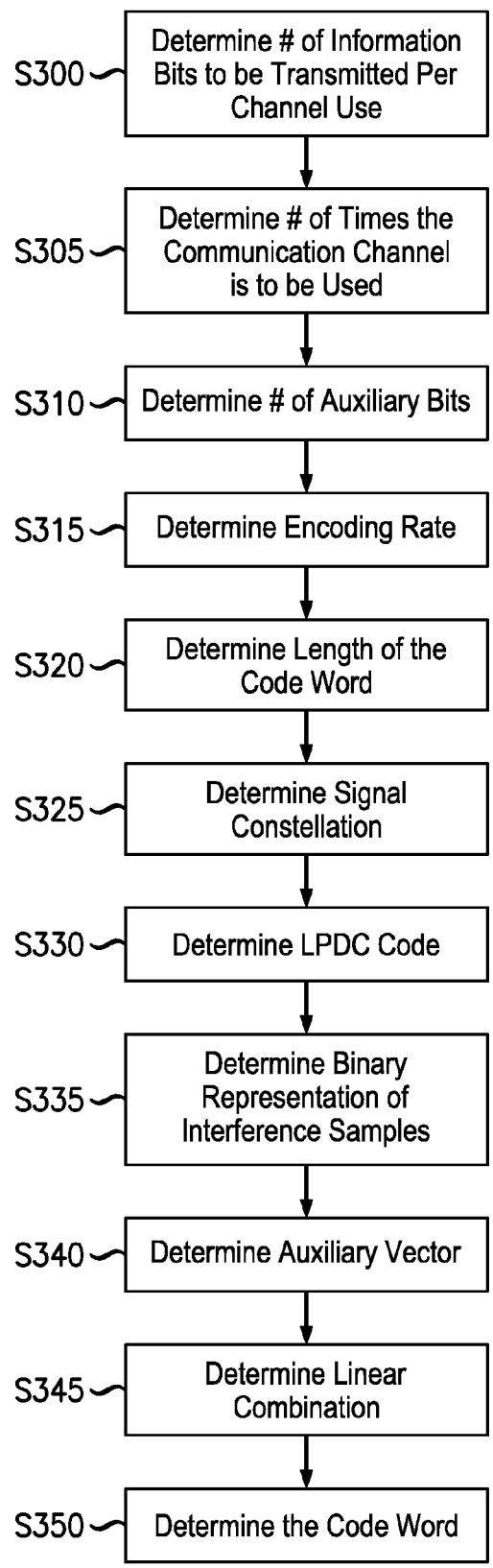
FIG. 3 describes a method for determining a code word for encoding the data, according to an example embodiment.

FIG. 3 describes a method for determining a code word for encoding the data, according to an example embodiment. At S300, the processor 125 may determine a number of base information bits to be transmitted over the communication channel. In one example embodiment, the transmitting unit 105 may be configured to transmit one base information bit per use of the communication channel 135. The base information bits may correspond to the input data received via the input unit 115 at S200.

For purposes of illustrating the underlying concept, assume that a base information vector including 5 base information bits is to be transmitted over the communication channel 135. Let $m_b$ denote the base information vector, including the 5 base information bits:

$m_b = [b_1, b_2, b_3, b_4, b_5]$

At S305, the processor 125 may determine the number of times the communication channel 135 may be used for transmitting all of the base information bits of $m_b$. The number of times the communication channel is to be used may be denoted by L. Therefore, in the above described example, given that there are 5 base information bits in $m_b$ and that one base information bit is to be transmitted over each use of the communication channel 135, the number of times the communication is to be used is 5. In other words, L=5.

At S310, the processor 125 determines a number of auxiliary bits, which may be denoted by $m_a$. Auxiliary bits may represent a number of bits that need to be combined with the base information bits in order to implement DPC.

In one example embodiment, the processor 125 determines the number of auxiliary bits as follows. Assume that there is an acceptable bit error rate that is achieved (in the absence of an interference signal) when a transmission is carried out using a suitable coding scheme at a rate of one base information bit per channel use and average per-symbol transmit energy of P units. Furthermore, assume that the communication of the base information bits needs to take place in the presence of a known interfering signal with average per-symbol energy equal to Q. In this example embodiment, Q is assumed to be equal to 15 P (i.e. approximately 12 dB above the transmit energy needed to achieve the desired frame error rate in the absence of the interference.)

Let β denote the number of auxiliary bits per channel use needed to implement DPC in accordance with the example embodiments. In one example embodiment, β may be determined based on the following formula:

$\beta = \frac{1}{2} \log_2(1 + Q/P)$

Therefore, in the example embodiment described above, with the per-symbol interference energy (Q) equal to 15 P, the processor 125 determines the number of auxiliary bits β to be equal to 2 per channel use. Moreover, since code vectors, which will be further described below, are to be transmitted over L=5 channel uses, 2 L=10 auxiliary bits may be needed to implement DPC.

In one example embodiment, the base information bits $m_b$ and auxiliary bits $m_a$ may be collectively referred to as information bits. Therefore, in the above described example embodiment, since the transmitting unit 105 is to transmit 5 base information bits to the receiver, then 15 information bits in all, 5 base information bits and 10 auxiliary bits, are to be transmitted over 5 channel uses. In one example embodiment and at this stage of the processor, the 5 base information bits may be known while the 10 auxiliary bits may be unknown and thus need to be chosen appropriately.

Prior to encoding the information bits ($m_b$ and $m_a$), a Low Density Parity Check (LPDC) code of a suitable rate may be determined. Low Density Parity Check (LDPC) codes are known for their efficiency in terms of the Signal-to-Noise-Ratio (SNR) they require to achieve a given bit error rate as well as for the fact that they work well with high order signal constellations. Generally, a low-rate code has better distance properties compared to a higher rate code. However, in order to maintain a desired information transmission rate (1 base information bit per channel use in the example embodiment described above), a lower code rate forces one to use higher order signal constellations, which will be described below, resulting in some performance loss.

At S315, the processor 125 may determine the encoding rate. In one example embodiment, the processor 125 may determine the encoding rate as a tradeoff between the distance properties and the acceptable performance loss. Furthermore, the encoding rate may be determined based on empirical studies, taking into account the tradeoffs. In the example embodiment described above, the empirical studies may conclude that an LDPC code with code rate ¾ (with a 16 level Pulse Amplitude Modulated (PAM) constellation, the determination of which will be further described below) performs better than LDPC codes with lower code rates (e.g. rate ⅗ with a 32-PAM constellation or rate ½ with 64-PAM constellation). Therefore, in the example embodiment described above, the processor 125 may determine the encoding rate to be ¾.

At S320, the processor 125 may determine a length of the code word to be constructed. The length of the code word may be denoted by N. In the example embodiment described above, since the processor 125 is to encode 15 information bits at a rate of ¾, the number of bits in a code word would be equal to 20 (e.g., 15/(¾)=20).

At S325, the processor 125 may determine the appropriate signal constellation. A signal constellation may be used for mapping entries of an encoded code word to signal points for transmission. A signal constellation may be a Pulse Amplitude Modulation (PAM) signal constellation or a Quadrature Amplitude Modulation (QAM) signal constellation. Furthermore, a signal constellation may have different levels (e.g., 16, 32, 64, etc.). FIG. 4 depicts a signal constellation used in encoding the data, according to an example embodiment. Hereinafter, a PAM signal constellation is used for purposes of describing example embodiments.

The processor 125 may determine the appropriate signal constellation based on the length of the code word, determined at S320, and the number of times the communication channel 135 is to be used, determined at S305. In the example embodiment described above, the code word is determined to have a length of 20 and the number of channel uses is determined to be equal to 5. Therefore, a signal constellation that allows transmission of 4 bits per channel use suffices. Therefore, a 16-PAM ($2^4=16$) signal constellation may be chosen to map coded bits to signal points (which may also be referred to as transmission symbols.) FIG. 4 illustrates a 16-PAM constellation signal. In one example embodiment, a well-known Gray coding may be used when mapping coded bits to signal points.

At S330, the processor 125 may determine the appropriate LPDC code for which the rate, described above, and code word length have been determined. The processor 125 may generate the appropriate LPDC code given the determined rate (e.g., ¾, in the example embodiment described above) and the determined code word length N (e.g., N=20, in the example embodiment described above).

For example, the processor 125 determines the LDPC code with parity check matrix H shown below. The processor 125 may "randomly" generate the matrix H while ensuring that each column has three non-zero entries, each row has precisely 12 non-zero entries, and all rows are linearly independent. The parity check matrix H may have M rows, where M=N−(K+J), with N being the number of bits in the code word, J may be set equal to Lβ or suitably rounding the latter, and K is the number of base information bits of the base information vector $m_b$. The processor 125 may also rearrange the columns of H to ensure that last M columns of the matrix H are linearly independent.

$$H = \begin{bmatrix} 1 & 1 & 0 & 0 & 1 & 0 & 1 & 1 & 0 & 0 & 1 & 1 & 1 & 1 & 1 & 1 & 0 & 0 & 0 \\ 1 & 0 & 1 & 1 & 1 & 0 & 0 & 1 & 1 & 1 & 0 & 0 & 1 & 0 & 1 & 1 & 0 & 1 & 1 & 0 \\ 0 & 1 & 1 & 0 & 0 & 1 & 0 & 1 & 0 & 1 & 0 & 1 & 1 & 1 & 0 & 0 & 1 & 1 & 1 & 1 \\ 1 & 0 & 0 & 1 & 0 & 1 & 1 & 0 & 1 & 0 & 1 & 1 & 0 & 1 & 0 & 1 & 1 & 0 & 1 & 1 \\ 0 & 1 & 1 & 1 & 1 & 1 & 1 & 0 & 1 & 1 & 1 & 0 & 0 & 0 & 1 & 0 & 0 & 1 & 0 & 1 \end{bmatrix}$$

The processor 125 may, after rearrangement, write H as $H=[H_I|H_P]$, where the sub-matrix $H_I$ constitutes the first N−M (=J+K) columns and $H_P$ the last M columns of H. Clearly, since the columns of Hp are independent, Hp is non-singular. Now, any (N−M)×N binary matrix of rank (N−M) whose rows are orthogonal to the rows of H may be used as a generator matrix G of the desired LDPC code. In one example embodiment, G may be given by:

$$G=[I_{(K+J)\times(K+J)}|H_I'(H_P')^{-1}],$$

where $I_{(K+J)\times(K+J)}$ is a (K+J)×(K+J) identity matrix, $H_I'$ is the transpose of the matrix $H_I$, and $H_P'$ is the transpose of the matrix $H_P$. Accordingly, binary N-vectors of the form m·G are orthogonal to the rows of the parity check matrix H (i.e. are legitimate code vectors belonging to the desired LDPC code). In one example embodiment, m may denote either a concatenation of $m_b$ and $m_a$ or a binary vector obtained by interleaving the entries of $m_b$ and $m_a$. Moreover, if Π(G) is a matrix obtained by permuting the columns of G and Π(H) is the matrix obtained by carrying out the same permutation on the columns of H, then vectors of the form m·Π(G) span a K+J-dimensional subspace of the space of binary N-vectors and are orthogonal to the rows of Π(H). In other words, Π(G) is also a generator matrix of a similar LDPC code and Π(H) is its parity check matrix.

Therefore, the processor 125 may generate code words of the form c=m·G, where the generator matrix G is as described above. Thus, c=[m|m·$G_P$], where the matrix $G_P$ equals $H_I'(H_P')^{-1}$. That is, the processor 125 may generate a code word, where the first (K+J) entries of each code word comprises the entries of the corresponding information vector m while its remaining N−(K+J) entries (referred to as parity bits) equal the product of m with the matrix $G_P$.

As described above, the information vector m (also referred to as the combined information vector) may be a concatenation of the base information vector $m_b$ and the auxiliary vector $m_a$, i.e. $m=[m_b|m_a]$. Therefore, the corresponding code word c may be written as $[m_b|m_a|m·G_P]$. That is, the first K bits of the code vector equal the corresponding base information bits, the next J bits equal the corresponding auxiliary bits while the remaining N−(J+K) bits equal the product m·$G_P$. Thus, the code word c($m_b$, $m_a$) that corresponds to the base information vector $m_b$ and auxiliary vector $m_a$ is given by:

$$c(m_b,m_a)=[m_b|m_a]G,=[m_b|m_a|(m_bG_{Pb}+m_aG_{Pa})],$$

where $G_{Pb}$ and $G_{Pa}$ are appropriate sub-matrices of $G_P$.

An objective of an encoding process implemented by the processor 125 is, for a given base information vector $m_b$ and interference vector v, to find an auxiliary vector $\tilde{m}_a$ such that the corresponding code word $[m_b|\tilde{m}_a]·G$, when mapped to a corresponding code vector via function F (e.g., s($m_b$,v)=F($[m_b|\tilde{m}_a]·G$)), minimizes the distance between the interference vector v and all code vectors of the form F($[m_b|m_a]·G$). In one example embodiment, the function F represents the process of mapping groups of bits within a code word to a sequence of signal points in a suitable signal constellation to obtain a code vector.

In one example embodiment, the processor is configured to, instead of attempting to find the auxiliary vector $m_a$ that minimizes the distance between the corresponding code vector and the interference vector, to find an auxiliary vector $m_a$ such that the corresponding code vector is quite close to the interference vector, although such code vector may not be the closest to the interference vector v.

In principle, when a code vector is constructed from a code word, each group of b bits gets mapped to a signal point or transmission symbol in the selected signal constellation. In the above described example embodiment, b equals 4, i.e. each group of 4 coded bits (entries in a code word) gets mapped to a signal point in accordance with the Gray Code illustrated in FIG. 4. The left-most bit in each such quartet of bits that gets mapped to a signal point is the most significant of these four bits since an error in this bit may have a larger impact than an error in any of the other bits. The right-most bit in each such quartet, on the other hand, is the least significant bit. Now, finding a code vector that is close to the interference vector may be, qualitatively, akin to finding a code vector that provides a good approximation for the interference vector. Such code vector may be determined by finding a code word that matches a binary representation of the interference vector in as many significant bit positions as possible and then mapping that code word to the corresponding code vector.

In order to determine such a code word, at S335, the processor 125 obtains binary representation of the interference vector v. First, the processor 125 determines a number of interference samples based on the number of channel uses L. Therefore, in the above described example embodiment, the number of interference samples is 5. The interference vector v may be written as v=[v(1), v(2), . . . , v(5)], where v(1) denotes the first interference sample, v(2) denotes the second interference sample, etc.

Thereafter, the processor 125 uses the signal constellation determined at S325 to quantize the interference vector v. In the above described example embodiment, the processor 125 uses the signal constellation illustrated in FIG. 4 to quantize entries of v, and then represent each of them with the 4-bit binary representation of the corresponding quantized level.

For example, if v=[11.4d, −6.5d, 17.2d, −8.9d, 10.1d], the corresponding quantized vector would be $v_q$=[+11 d, −7d, +15d, −9d, +11d], which would map into the binary vector $v_{bin}$=[1011, 0110, 1000, 0010, 1011]. Accordingly, each entry of the quantized vector $v_q$ comprises the signal point (PAM level) that is closest to the corresponding entry of v, and that each quartet of bits in $v_{bin}$ is a 4-bit representation of the corresponding entry of $v_q$. We write $v_{bin}$=[$v_{bin}$(1), $v_{bin}$(2), ..., $v_{bin}$(5)], where $v_{bin}$(1) denotes the first quartet of bits within $v_{bin}$, $v_{bin}$(2) denotes the second quartet of bits within $v_{bin}$, and so on. Thus, for instance, $v_{bin}$(1)=[1 0 1 1], $v_{bin}$(2)=[0 1 1 0], and so on, in the above example. Note that $v_{bin}$(1) is a 4-bit binary representation of the interference sample v(1), $v_{bin}$(2) is a 4-bit binary representation of the interference sample v(2), and so on.

At S340, the processor 125 determines the auxiliary vector by mapping values corresponding to the most significant bits of each interference sample to auxiliary bits used for each transmission over the communication channel 135.

The processor 125 performs the mapping as follows. For a given base information vector $m_b$, all code words associated with such base information vector are of the form c($m_b$, $m_a$)=[$m_b$|$m_a$|($m_b G_{Pb}$+$m_a G_{Pa}$)], where $m_a$ is a binary J-vector. While the base information vector $m_b$ is fixed, as described above, the processor 125 attempts to determine the auxiliary vector $m_a$ to obtain a good approximation to the binary vector $v_{bin}$. In doing so, the processor 125, attempts to match the binary vector $v_{bin}$ in as many significant bit positions as possible.

Figure 5:
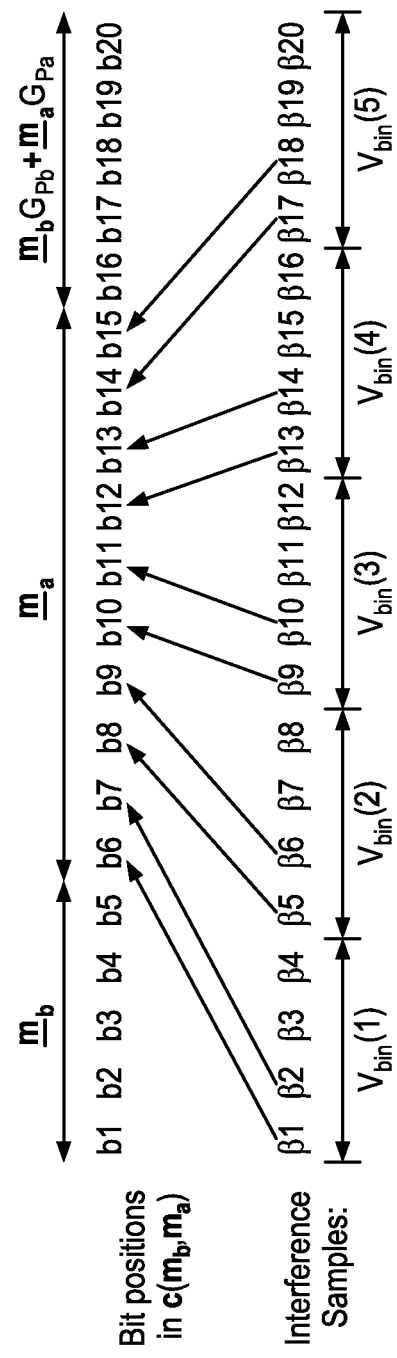
FIG. 5 depicts a determination of auxiliary bits used in encoding the data, according to an example embodiment.

FIG. 5 depicts a determination of auxiliary bits used in encoding the data, according to an example embodiment. As illustrated in FIG. 5 and discussed above, the code word c has the form c($m_b$, $m_a$)=[$m_b$|$m_a$|($m_b G_{Pb}$+$m_a G_{Pa}$)]. In one example embodiment and prior to determining the auxiliary bits, the auxiliary vector $m_a$ includes bits which may be thought of as placeholders until the processor 125 determines the appropriate values of the auxiliary vector.

Furthermore, β1-β20 may represent the entries of $v_{bin}$, the binary representation of the interference vector v determined at S335. In FIG. 5 and in accordance with the above described example embodiment, β1 and β2 represent the most significant bits of the binary quartet $v_{bin}$(1), which represents the first interference sample v(1), β5 and β6 represent the most significant bits of the binary quartet $v_{bin}$(2) representing the second interference sample v(2), β9 and β10 represent the most significant bits of the binary quartet $v_{bin}$(3) representing the third interference sample v(3), β13 and β14 represent the most significant bits of the binary quartet $v_{bin}$(4) representing the fourth interference sample v(4), and β17 and β18 represent the most significant bits of the binary quartet $v_{bin}$(5) which represents the fifth interference sample v(5).

Thereafter, the processor 125 may map values corresponding to β1 and β2 to b6 and b7 of the code word c($m_b$, $m_a$) corresponding to two entries of the auxiliary vector $m_a$. The processor 125 may map values corresponding to β5 and β6 to b8 and b9 of the code word c($m_b$, $m_a$) corresponding to two other entries of the auxiliary vector $m_a$. The processor 125 may map values corresponding to β9 and β10 to b10 and b11 of the code word c($m_b$, $m_a$) corresponding to two more entries of the auxiliary vector $m_a$. The processor 125 may map values corresponding to β13 and β14 to b12 and b13 of the code word c($m_b$, $m_a$) corresponding to two more entries of the auxiliary vector $m_a$ and finally, the processor 125 may map values corresponding to β17 and β18 to b14 and b15 of the code word c($m_b$, $m_a$) corresponding to two more entries of the auxiliary vector $m_a$. At this point, the processor 125 has determined the appropriate values of $m_a$.

Once the processor 125 determines $m_a$, the processor 125, at S345 determines a linear combination of $m_a$ and $m_b$ using a generator matrix, described above.

At S350, the processor 125 may determine the code word according to c($m_b$, $m_a$)=[$m_b$|$m_a$|($m_b G_{Pb}$+$m_a G_{Pa}$)], using the base information vector, the determined auxiliary vector and a linear combination thereof, as described above.

Referring back to FIG. 2, once the processor 125 determines the code word, at S215, the processor 125 permutes the determined code word. The permuted code word may be represented by the symbol Π(c($m_b$, $m_a$)).

Figure 6:
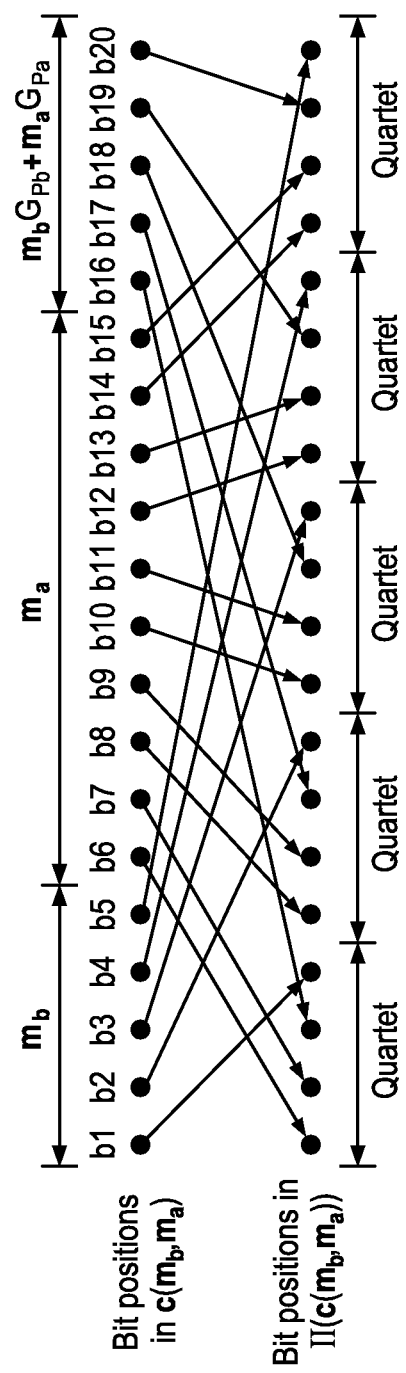
FIG. 6 illustrates a permutation of a determined code word, according to an example embodiment.

FIG. 6 illustrates a permutation of a determined code word, according to an example embodiment. As illustrated and with respect to the above described example embodiment, each quartet of the permuted code word, which will be further mapped into signal points, includes two of the determined auxiliary bits in its most significant bit positions, one of the base information bits b1-b5 in the least significant bit position, and one bit from the determined linear combination in the remaining bit position.

At S220, the processor 125 may determine the code vector associated with the permuted code word. In one example embodiment, the processor 125 may map each determined quartet into a signal point according to, for example, the 16-PAM signal constellation depicted in FIG. 4. The determined code vector may be denoted by s($m_b$,v). As described above, the processor 125 may implement the mapping using the well-known Gray coding method.

At S225, the processor 125 may determine a transmit vector by subtracting the interference vector v from the determined code vector s($m_b$,v). The transmit vector may be denoted as x=s($m_b$,v)−v.

At S230, the processor 125 may optionally refine the determined code vector s($m_b$,v) to reduce the difference between the determined code vector and the interference vector. Since the transmit vector x, determined at S225, equals this difference, the optional refining of the code vector may reduce the energy associated with the transmit vector x.

In one example embodiment, the processor 125 may refine the code vector as follows. Let $s_{best}$ and $e_{best}$ respectively describe estimates of the best code vector and the energy associated with the corresponding transmit vector at any stage. The processor 125 may initialize $s_{best}$ to s($m_b$,v), as determined in S220, and $e_{best}$ to |s($m_b$,v)−v|$^2$.

Next, the processor 125 may randomly toggle the determined auxiliary bits and calculate the effect of toggling the value of that auxiliary bit on the transmit vector, i.e. the energy associated with the difference between the code vector associated with the toggled value of the auxiliary bit and the interference vector. The energy associated with the difference between two vectors is also referred to as the distance between those vectors.

Let $s_{best}^{(j)}$ and $e_{best}^{(j)}$ respectively denote the new code vector that can be obtained from $s_{best}$ by toggling the value of the auxiliary bit $b_j$ and the quantity |$s_{best}^{(j)}$−v|$^2$. If $e_{best}^{(j)}$ is less than $e_{best}$, the processor 125 may replace $s_{best}$ with $s_{best}^{(j)}$ and $e_{best}$ with $e_{best}^{(j)}$. Otherwise, the processor 125 may simply move on to the next auxiliary bit in the random order.

In one example embodiment, the processor 125 may cyclically step through the auxiliary bits until no improvement in the distance value may be obtained for a whole cycle. Thereafter, the processor 125 may designate the quantity $s_{best}$ as the best estimate of the code vector and $e_{best}$ the best estimate of the energy associated with the transmit vector x.

In one example embodiment, the processor 125 may carry out one or more tries (as described above), each time selecting a different randomly generated order of auxiliary bits. Each try yields the best estimate of the code vector for that particular try and the energy associated with the corresponding transmit vector. The estimate of the best code vector associated with the try that yields the smallest value of the energy represents the overall best estimate of the code vector. Accordingly, at S235, the processor 125 may update the transmit vector determined at S225.

Although the DPC theory states the auxiliary bit rate (i.e. the number of auxiliary bits per channel) must be greater than or equal to the quantity $\beta(=\frac{1}{2}\log_2(1+\alpha^2 Q/P))$, such a condition need not be strictly enforced in every specific scenario. Using an auxiliary bit rate smaller than $\beta$ would lead to an increase in the average energy associated with the transmit vector; however, even with this increase, the transmit energy may still be lower than what one may achieve with a conventional system. Similarly, the number of auxiliary bits per channel use does not have to be an integer (as in the example described above) and other possibilities for numbers of the auxiliary bits to be used per channel use are contemplated and within the scope of the present disclosure.

Furthermore, the construction of the DPC scheme described above used a systematic form of the generator matrix of the LDPC code. However, the construction of a DPC scheme need not be limited to systematic forms of the generator matrix described above. For example, a generator matrix G of rank K+J, after a suitable permutation of its columns, may be written in the form:

$$G = \begin{bmatrix} G_{bb} & G_{ba} & G_{Pb} \\ G_{ab} & G_{aa} & G_{Pa} \end{bmatrix}$$

where $G_{bb}$, $G_{ba}$, $G_{ab}$, $G_{aa}$, $G_{Pb}$ and $G_{Pa}$ respectively are K×K, K×J, J×K, J×J, K×(N−K−J) and J×(N−K−J) sub-matrices of G and the matrix $G_{aa}$ is non-singular. (In the systematic form, the matrices $G_{ba}$ and $G_{ab}$ are all-zero matrices while the matrices $G_{bb}$ and $G_{aa}$ are identity matrices of appropriate sizes.) As a consequence, the code word entries corresponding to bit numbers K+1 through K+J equal $m_b G_{ba} + m_a G_{aa}$ (instead of just $m_a$ as in a systematic form). Accordingly, entries of the vector $m_b Gb_a + m_a G_{aa}$ may be mapped to the more significant bits of $v_{bin}$, from which $m_a$ may be obtained. (This follows from the fact that in this case $m_a$ is equal to $(\tilde{v}_{bin} + m_b G_{ba}) G_{aa}^{-1}$, where $\tilde{v}_{bin}$ represents the more significant bits of $v_{bin}$.) Once a permutation to obtain the desired mapping and determine the auxiliary vector $m_a$ is created, the rest of the construction may follow along the lines of the original construction with a systematic generator matrix.

Once the processor 125 determines the transmit vector at S225 and/or S235, the transmitting unit 105, via the transmitter 130 may transmit the determined transmit vector to the receiving unit 110 via the communication channel 135.

The receiving unit 110 may receive the transmitted transmit vector via the receiver 140. The receiver 140 may receive a vector r, which equals $x+v+n=(s(m_b,v)-v)+v+n=s(m_b,v)+n$, where n is a noise vector. Since $s(m_b,v)$ is a code vector obtained by mapping an LDPC code word corresponding to the generator matrix $\Pi(G)$ mapped to a sequence of signal points within a signal constellation according to the process described above, the processor 150 of the decoder 145 may use a standard (e.g. message-passing) LDPC decoder based on the parity check matrix $\Pi(H)$ to obtain the best estimate of the information vector transmitted by the transmitting unit 105. In one example embodiment, entries within this information vector that correspond to the base information vector constitute the desired estimate of the base information bits transmitted by the sending unit.

Variations of the example embodiments are not to be regarded as a departure from the spirit and scope of the example embodiments, and all such variations as would be apparent to one skilled in the art are intended to be included within the scope of this disclosure.

What is claimed:

1. A method for reducing an effect of an interference signal on data transmitted over a communication channel, comprising:

determining an auxiliary vector based on a number of base information bits representing the data to be transmitted over the communication channel, a number of times the communication channel is used and an interference vector representing the interference signal;

determining, by the processor, a code word based on a base information vector and the auxiliary vector, the base information vector including the base information bits; and generating, by the processor, a transmit vector for transmission based on the determined code word and the interference vector.

2. The method of claim 1, wherein the number of the base information bits represents the data to be transmitted over a single use of the communication channel, the number of times the communication channel is to be used is based on the number of the base information bits, and the determining the auxiliary vector includes, determining a number of auxiliary bits forming the auxiliary vector based on the number of times the communication channel is to be used, a transmit energy associated with transmitting the data and a transmit energy associated with the interference signal, wherein the determining the auxiliary vector determines the auxiliary vector based on the determined number of auxiliary bits.

3. The method of claim 2, wherein the determining the auxiliary vector comprises:

determining binary representations of interference samples of the inference vector based on the number of times the communication channel is to be used and a signal constellation; and mapping values corresponding to one or more most significant bits of the binary representation of the interference samples to auxiliary bits of the auxiliary vector, the mapped values representing the auxiliary vector.

4. The method of claim 3, wherein the determining the code word comprises:

determining a rate associated with the determined code word; and determining a length of the code word based on the determined rate, the number of the base information bits and the number of the auxiliary bits, wherein the determining the code word is based on the base information vector, the determined auxiliary vector and the determined length.

5. The method of claim 4, wherein the determining the code word comprises:
   determining the signal constellation for encoding the code word based on the determined length and the determined number of times the communication channel is to be used, wherein
   the determining the code word is based on the base information vector, the determined auxiliary vector, the determined length and the determined signal constellation.

6. The method of claim 5, wherein the determining the code word comprises:
   determining a linear combination of the base information bits and the determined auxiliary bits, wherein
   the determined code word is a concatenation of the auxiliary bits, the base information bits and the linear combination.

7. The method of claim 1, further comprising:
   determining a permutation of the determined code word; and
   determining a code vector based on the permuted code word, wherein
   the generating the transmit vector includes subtracting the interference vector from the determined code vector.

8. The method of claim 7, wherein the determining the code vector comprises:
   mapping entries of the permuted code word to signal points using a mapping scheme.

9. The method of claim 7, further comprising:
   refining the code vector to reduce a distance between the interference vector and the code vector.

10. The method of claim 9, wherein the refining the code vector comprises:
    changing auxiliary bits of the determined auxiliary vector; and
    determining an updated code vector based on the changed auxiliary bits;
    determining whether a first distance between the updated code vector and the interference vector is less than a second distance between the code vector and the interference vector; and
    replacing the code vector with the updated code vector upon determining that the first distance is less than the second distance.

11. The method of claim 1, further comprising:
    transmitting the transmit vector over the communication channel.

12. A transmitting unit comprising a processor configured to,
    determine an auxiliary vector based on a number of base information bits representing the data to be transmitted over the communication channel, a number of times the communication channel is used and an interference vector representing the interference signal;
    determine a code word based on a base information vector and the auxiliary vector, the base information vector including the base information bits; and
    generate a transmit vector for transmission based on the determined code word and the interference vector.

13. The transmitting unit of claim 12, wherein
    the number of the base information bits represents the data to be transmitted over a single use of the communication channel,
    the number of times the communication channel is to be used is based on the determined number of the base information bits, and
    the processor is configured to determine the auxiliary vector by,
       determining a number of auxiliary bits forming the auxiliary vector based on the determined number of times the communication channel is to be used, a transmit energy associated with transmitting the data and a transmit energy associated with the interference signal, wherein
    the processor determines the auxiliary vector based on the determined number of auxiliary bits.

14. The transmitting unit of claim 13, wherein the processor is configured to determine the auxiliary vector by,
    determining binary representations of interference samples of the inference vector based on the number of times the communication channel is to be used and a signal constellation; and
    mapping values corresponding to one or more most significant bits of the binary representation of the interference samples to auxiliary bits of the auxiliary vector, the mapped values representing the auxiliary vector.

15. The transmitting unit of claim 14, wherein the processor is configured to determine the code word by,
    determining a rate associated with the determined code word; and
    determining a length of the code word based on the determined rate, the number of the base information bits and the number of the auxiliary bits, wherein
    the determining the code word is based on the base information vector, the determined auxiliary vector and the determined length.

16. The encoder of claim 15, wherein the processor is configured to determine the code word by,
    Determining the signal constellation for encoding the code word based on the determined length and the determined number of times the communication channel is to be used, wherein
    the processor determines the code word based on the base information vector, the determined auxiliary vector, the determined length and the determined signal constellation.

17. The transmitting unit of claim 16, wherein the processor is further configured to determine the code word by,
    determining a linear combination of the base information bits and the determined auxiliary bits, wherein
    the determined code word is a concatenation of the auxiliary bits, the base information bits and the linear combination.

18. The transmitting unit of claim 12, wherein the processor is further configured to,
    determine a permutation of the determined code word; and
    determine a code vector based on the permuted code word, wherein
    the processor generates the transmit vector by subtracting the interference vector from the determined code vector.

19. The transmitting unit of claim 18, wherein the processor determines the code vector by mapping entries of the permuted code word to signal points using a mapping scheme.

20. The transmitting unit of claim 18, wherein the processor is further configured to refine the code vector to reduce a distance between the interference vector and the code vector.

21. The transmitting unit of claim 20, wherein the processor refines the code vector by,
    changing auxiliary bits of the determined auxiliary vector; and
    determining an updated code vector based on the changed auxiliary bits;

determining whether a first distance between the updated code vector and the interference vector is less than a second distance between the code vector and the interference vector; and replacing the code vector with the updated code vector upon determining that the first distance is less than the second distance.

22. The encoder of claim 12, wherein the transmitting unit is configured to transmit the transmit vector over the communication channel.

* * * * *